US 9,692,710 B2

(12) United States Patent
Bhatia et al.

(10) Patent No.: US 9,692,710 B2
(45) Date of Patent: *Jun. 27, 2017

(54) MEDIA STREAM MANAGEMENT (71) Applicant: GENBAND US LLC, Plano, TX (US)

(72) Inventors: Medhavi Bhatia, Germantown, MD (US); Sohan Shetty, Germantown, MD (US); Gaurav Kulshrestha, Herndon, VA (US); Paritosh Tyagi, Boyds, MD (US); Bruce Mattie, Germantown, MD (US)

(73) Assignee: GENBAND US LLC, Plano, TX (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/740,127

(22) Filed: Jun. 15, 2015

(65) Prior Publication Data
US 2015/0358252 A1    Dec. 10, 2015

Related U.S. Application Data (63) Continuation of application No. 11/314,119, filed on Dec. 21, 2005, now Pat. No. 9,060,047.

(51) Int. Cl.
*H04L 12/927* (2013.01)
*H04L 29/06* (2006.01)
*H04M 7/00* (2006.01)

(52) U.S. Cl.
CPC ............ *H04L 47/80* (2013.01); *H04L 65/103* (2013.01); *H04L 65/104* (2013.01);
(Continued)

(58) Field of Classification Search
CPC ... H04L 47/80; H04L 65/4069; H04L 65/608; H04L 65/1006; H04L 65/605;
(Continued)

(56) References Cited

U.S. PATENT DOCUMENTS 4,164,193 A    8/1979 Smith
5,918,020 A    6/1999 Blackard et al.
(Continued)

FOREIGN PATENT DOCUMENTS

CN    1556655 A    12/2004
EP    1 263 242 A2    12/2002
(Continued)

OTHER PUBLICATIONS

Advisory Action Before the Filing of Appeal Brief and Examiner-Initiated interview Summary for U.S. Appl. No. 11/427,220 (Jun. 15, 2016).
(Continued)

*Primary Examiner* — Ajay Cattungal
(74) *Attorney, Agent, or Firm* — Jenkins, Wilson, Taylor & Hunt, P.A.

(57) ABSTRACT

In a method and system for managing at least one media stream from a media source to a media destination, where the media stream passes through at least one network, providing a media manager for managing the media stream and the at least one network for performing at least one of the management functions bandwidth management, media hairpin detection, media path control, equal access or preventing media backhauling. In the media manager at least one of the media stream information types media routing, receive transport address, routed receive transport address, source network, destination network, media stream identifier, or bandwidth of the media stream is stored for a time period during which the media stream exists in the at least one network. The media manager uses at least one of the stored information types for performing at least one of the management functions.

44 Claims, 9 Drawing Sheets (52) U.S. Cl.
CPC ...... *H04L 65/1006* (2013.01); *H04L 65/1043* (2013.01); *H04L 65/4069* (2013.01); *H04L 65/605* (2013.01); *H04L 65/608* (2013.01); *H04L 65/80* (2013.01); *H04M 7/006* (2013.01)

(58) Field of Classification Search
CPC ... H04L 65/80; H04L 65/103; H04L 65/1043; H04M 7/006
See application file for complete search history.

(56) References Cited

U.S. PATENT DOCUMENTS

| | | | |
|---|---|---|---|
| 5,945,922 A * | 8/1999 | Gao | H04L 49/1515 340/2.22 |
| 6,473,793 B1 | 10/2002 | Dillon et al. | |
| 6,570,855 B1 | 5/2003 | Kung et al. | |
| 6,600,737 B1 | 7/2003 | Lai et al. | |
| 6,678,359 B1 | 1/2004 | Gallick | |
| 6,738,808 B1 | 5/2004 | Zellner et al. | |
| 6,775,269 B1 | 8/2004 | Kaczmarczyk et al. | |
| 6,775,280 B1 | 8/2004 | Ma et al. | |
| 6,798,786 B1 | 9/2004 | Lo et al. | |
| 6,904,017 B1 | 6/2005 | Meempat et al. | |
| 6,925,461 B2 | 8/2005 | Byers | |
| 6,944,678 B2 | 9/2005 | Lu et al. | |
| 6,980,526 B2 | 12/2005 | Jang et al. | |
| 7,002,973 B2 | 2/2006 | MeLampy et al. | |
| 7,028,092 B2 | 4/2006 | MeLampy et al. | |
| 7,031,311 B2 | 4/2006 | MeLampy et al. | |
| 7,072,303 B2 | 7/2006 | MeLampy et al. | |
| 7,116,767 B2 | 10/2006 | Yang et al. | |
| 7,133,923 B2 | 11/2006 | MeLampy et al. | |
| 7,142,532 B2 | 11/2006 | Penfield et al. | |
| 7,151,781 B2 | 12/2006 | MeLampy et al. | |
| 7,180,993 B2 | 2/2007 | Hamilton | |
| 7,193,996 B2 | 3/2007 | Dobbins et al. | |
| 7,260,060 B1 | 8/2007 | Abaye et al. | |
| 7,260,085 B2 | 8/2007 | Dobbins et al. | |
| 7,277,384 B1 | 10/2007 | Chan et al. | |
| 7,289,489 B1 | 10/2007 | Kung et al. | |
| 7,310,333 B1 * | 12/2007 | Conklin | H04Q 3/68 370/388 |
| 7,385,924 B1 | 6/2008 | Riddle | |
| 7,411,975 B1 | 8/2008 | Mohaban | |
| 7,457,312 B2 * | 11/2008 | Weiss | H04L 12/5695 370/468 |
| 7,512,078 B2 | 3/2009 | Swain et al. | |
| 7,525,952 B1 | 4/2009 | Shankar et al. | |
| 7,525,994 B2 | 4/2009 | Scholte | |
| 7,545,748 B1 | 6/2009 | Riddle | |
| 7,599,283 B1 | 10/2009 | Varier et al. | |
| 7,739,395 B1 | 6/2010 | Parlamas et al. | |
| 7,822,837 B1 | 10/2010 | Urban et al. | |
| 7,974,394 B1 | 7/2011 | Cao et al. | |
| 8,085,758 B2 | 12/2011 | Ramachandran et al. | |
| 8,194,640 B2 | 6/2012 | Ramachandran et al. | |
| 8,254,265 B2 | 8/2012 | Ramachandran et al. | |
| 8,406,128 B1 * | 3/2013 | Brar | H04L 49/15 370/229 |
| 8,547,962 B2 | 10/2013 | Ramachandran et al. | |
| 8,743,870 B2 | 6/2014 | Ramachandran et al. | |
| 8,755,371 B2 | 6/2014 | Ramachandran et al. | |
| 9,060,047 B2 | 6/2015 | Bhatia et al. | |
| 2001/0050911 A1 | 12/2001 | Eastman | |
| 2002/0062376 A1 | 5/2002 | Isoyama | |
| 2002/0114296 A1 | 8/2002 | Hardy | |
| 2002/0129236 A1 | 9/2002 | Nuutinen | |
| 2002/0136206 A1 | 9/2002 | Gallant et al. | |
| 2002/0181427 A1 | 12/2002 | Sparr et al. | |
| 2003/0016627 A1 | 1/2003 | MeLampy et al. | |
| 2003/0051130 A1 | 3/2003 | MeLampy et al. | |
| 2003/0086425 A1 | 5/2003 | Bearden et al. | |
| 2003/0097438 A1 | 5/2003 | Bearden et al. | |
| 2003/0137942 A1 | 7/2003 | Ladegaard | |
| 2003/0142681 A1 | 7/2003 | Chen et al. | |
| 2003/0145077 A1 | 7/2003 | Khan et al. | |
| 2003/0186702 A1 | 10/2003 | McConnell et al. | |
| 2003/0206546 A1 | 11/2003 | Beyda | |
| 2004/0005041 A1 | 1/2004 | Zahir Azami | |
| 2004/0005892 A1 | 1/2004 | Mayer et al. | |
| 2004/0009776 A1 | 1/2004 | Ishikawa et al. | |
| 2004/0010514 A1 | 1/2004 | Agarwal et al. | |
| 2004/0045030 A1 * | 3/2004 | Reynolds | H04L 29/06 725/110 |
| 2004/0072593 A1 | 4/2004 | Robbins et al. | |
| 2004/0086093 A1 | 5/2004 | Schranz | |
| 2004/0152422 A1 | 8/2004 | Hoglund et al. | |
| 2004/0156491 A1 | 8/2004 | Reding et al. | |
| 2004/0160979 A1 | 8/2004 | Pepin | |
| 2004/0165570 A1 | 8/2004 | Lee | |
| 2004/0193974 A1 | 9/2004 | Quan et al. | |
| 2004/0196867 A1 | 10/2004 | Ejzak et al. | |
| 2004/0224678 A1 | 11/2004 | Dahod et al. | |
| 2004/0249927 A1 | 12/2004 | Pezutti | |
| 2004/0266426 A1 | 12/2004 | Marsh et al. | |
| 2005/0021804 A1 * | 1/2005 | Hameleers | H04N 21/2662 709/231 |
| 2005/0025123 A1 | 2/2005 | Mitsumori et al. | |
| 2005/0030952 A1 | 2/2005 | Elmasry et al. | |
| 2005/0041648 A1 | 2/2005 | Bharatia et al. | |
| 2005/0052993 A1 | 3/2005 | Hanks et al. | |
| 2005/0052996 A1 | 3/2005 | Houck et al. | |
| 2005/0070230 A1 | 3/2005 | Das et al. | |
| 2005/0074026 A1 | 4/2005 | Soncodi et al. | |
| 2005/0078690 A1 | 4/2005 | DeLangis | |
| 2005/0083895 A1 | 4/2005 | Pinault | |
| 2005/0084088 A1 | 4/2005 | Hamilton | |
| 2005/0089014 A1 | 4/2005 | Levin et al. | |
| 2005/0108567 A1 | 5/2005 | D'Souza et al. | |
| 2005/0111382 A1 | 5/2005 | Le et al. | |
| 2005/0185657 A1 | 8/2005 | Karanassos | |
| 2005/0207358 A1 * | 9/2005 | Nishida | H04L 65/1006 370/261 |
| 2006/0007913 A1 | 1/2006 | Botkin et al. | |
| 2006/0045095 A1 | 3/2006 | Dhar et al. | |
| 2006/0067298 A1 | 3/2006 | Houck et al. | |
| 2006/0083193 A1 | 4/2006 | Womack et al. | |
| 2006/0093115 A1 | 5/2006 | Chen et al. | |
| 2006/0098577 A1 | 5/2006 | MeLampy et al. | |
| 2006/0117097 A1 | 6/2006 | Ogasawara et al. | |
| 2006/0146792 A1 | 7/2006 | Ramachandran et al. | |
| 2006/0156126 A1 | 7/2006 | Oshima | |
| 2006/0159129 A1 * | 7/2006 | Schmidt | H04Q 11/04 370/493 |
| 2006/0178130 A1 | 8/2006 | Makrygiannis | |
| 2006/0187927 A1 | 8/2006 | MeLampy et al. | |
| 2006/0218268 A1 | 9/2006 | Beck et al. | |
| 2006/0239255 A1 | 10/2006 | Ramachandran et al. | |
| 2006/0259958 A1 | 11/2006 | Jennings et al. | |
| 2006/0285493 A1 | 12/2006 | Manuja et al. | |
| 2006/0291447 A1 | 12/2006 | Siliquini et al. | |
| 2006/0291450 A1 | 12/2006 | Ramachandran et al. | |
| 2007/0019563 A1 | 1/2007 | Ramachandran et al. | |
| 2007/0019625 A1 | 1/2007 | Ramachandran et al. | |
| 2007/0036151 A1 | 2/2007 | Baeder | |
| 2007/0076591 A1 | 4/2007 | Khan | |
| 2007/0076594 A1 | 4/2007 | Khan et al. | |
| 2007/0076603 A1 | 4/2007 | MeLampy et al. | |
| 2007/0076710 A1 | 4/2007 | Khan | |
| 2007/0076855 A1 | 4/2007 | MeLampy et al. | |
| 2007/0104105 A1 | 5/2007 | MeLampy et al. | |
| 2007/0116043 A1 | 5/2007 | MeLampy et al. | |
| 2007/0156491 A1 | 7/2007 | Schuler et al. | |
| 2007/0280261 A1 * | 12/2007 | Szymanski | H04L 12/5601 370/395.4 |
| 2007/0286158 A1 * | 12/2007 | Cook | H04L 29/06027 370/352 |
| 2007/0291734 A1 | 12/2007 | Bhatia et al. | |
| 2008/0086564 A1 | 4/2008 | Putman et al. | |
| 2008/0239957 A1 | 10/2008 | Tokura et al. | |
| 2008/0285562 A1 * | 11/2008 | Scott | G06F 15/17362 370/392 |

(56) References Cited

U.S. PATENT DOCUMENTS

| | | | | |
|---|---|---|---|---|
| 2008/0301383 | A1* | 12/2008 | Nieminen | G06F 9/345 711/157 |
| 2010/0309811 | A1* | 12/2010 | Tanaka | H04L 12/4645 370/253 |
| 2010/0309906 | A1 | 12/2010 | Ramachandran et al. | |
| 2011/0087799 | A1* | 4/2011 | Padhye | H04L 12/6418 709/235 |
| 2011/0228767 | A1* | 9/2011 | Singla | H04L 49/00 370/389 |
| 2012/0189001 | A1 | 7/2012 | Ramachandran et al. | |
| 2014/0321453 | A1 | 10/2014 | Ramachandran et al. | |

FOREIGN PATENT DOCUMENTS

| | | |
|---|---|---|
| WO | WO 02/49279 A2 | 6/2002 |
| WO | WO 02/49315 A2 | 6/2002 |
| WO | WO 02/49316 A2 | 6/2002 |
| WO | WO 02/058349 | 7/2002 |
| WO | WO 2006/073481 A1 | 7/2006 |

OTHER PUBLICATIONS

Non-Final Office Action for U.S. Appl. No. 14/266,790 (Apr. 8, 2016).
Final Office Action for U.S. Appl. No. 11/427,220 (Feb. 12, 2016).
Non-Final Office Action for U.S. Appl. No. 11/427,220 (Jul. 15, 2015).
First Examination Report for Indian Application No. 5066/DELNP/2007 (Jun. 19, 2015).
Notice of Allowance for U.S. Appl. No. 11/314,119 (Jan. 5, 2015).
Final Office Action for U.S. Appl. No. 11/314,119 (Jul. 1, 2014).
Advisory Action for U.S. Appl. No. 11/427,220 (May 8, 2014).
Applicant-Initiated Interview Summary for U.S. Appl. No. 11/427,220 (Apr. 29, 2014).
Communication pursuant to Article 94(3) EPC for Application No, 05 763 863.7 (Apr. 17, 2014).
Extended European Search Report for European Application No. 06845686.2 (Mar. 6, 2014).
Final Office Action for U.S. Appl. No. 11/427,220 (Feb. 28, 2014).
Notice of Allowance and Fee(s) Due for U.S. Appl. No. 12/748,321 (Feb. 19, 2014).
Notice of Allowance and Fee(s) Due for U.S. Appl. No. 13/436,813 (Jan. 22, 2014).
Non-Final Office Action for U.S. Appl. No. 11/314,119 (Sep. 12, 2013).
Non-Final Office Action for U.S. Appl. No. 12/748,321 (Jul. 17, 2013).
Non-Final Office Action for U.S. Appl. No. 11/427,220 (Jul. 16, 2013).
Notice of Allowance and Fee(s) Due for U.S. Appl. No. 11/427,171 (May 23, 2013).
Non-Final Rejection for U.S. Appl. No. 13/436,813 (Feb. 21, 2013).
Notification of Second Office Action for Chinese Application No. 200580048016.9 (Sep. 3, 2012).
Corrected Notice of Allowability for U.S. Appl. No. 11/427,234 (Jul. 16, 2012).
Notice of Allowance and Fee(s) Due for U.S. Appl. No. 11/427,234 (Apr. 23, 2012).
Applicant-Initiated Interview Summary for U.S. Appl. No. 12/748,321 (Mar. 29, 2012).
Applicant-Initiated Interview Summary for U.S. Appl. No. 11/427,234 (Mar. 15, 2012).
Supplementary European Search Report for European Application No. 05763863.7 (Feb. 16, 2012).
Final Official Action for U.S. Appl. No. 12/748,321 (Dec. 21, 2011).
Notice of Allowance and Fee(s) Due for U.S. Appl. No. 11/026,746 (Dec. 12, 2011).
Non-Final Official Action for U.S. App. No. 11/427,234 (Nov. 9, 2011).
First Office Action for Chinese Application No. 200580048016.9 (Oct. 27, 2011).
Interview Summary for U.S. Appl. No. 12/748,321 (Sep. 6, 2011).
Non-Final Official Action for U.S. Appl. No. 11/026,746 (Jun. 17, 2011).
Final Official Action for U.S. Appl. No. 11/427,234 (Jun. 15, 2011).
Notice of Allowance and Fee(s) Due for U.S. Appl. No. 11/427,200 (Jun. 2, 2011).
Non-Final Official Action for U.S. Appl. No. 12/748,321 (May 23, 2011).
Non-Final Official Action for U.S. Appl. No. 10/596,904 (May 11, 2011).
Interview Summary for U.S. Appl. No. 11/427,220 (Apr. 27, 2011).
Interview Summary for U.S. Appl. No. 11/427,171 (Apr. 13, 2011).
Interview Summary for U.S. Appl. No. 11/427,234 (Mar. 29, 2011).
Final Official Action for U.S. Appl. No. 11/427,220 (Jan. 18, 2011).
Final Official Action for U.S. Appl. No. 11/026,746 (Jan. 4, 2011).
Interview Summary for U.S. Appl. No. 11/314,119 (Dec. 28, 2010).
Final Official Action for U.S. Appl. No. 11/427,171 (Dec. 22, 2010).
Non-Final Official Action for U.S. Appl. No. 11/427,234 (Oct. 18, 2010).
Final Official Action for U.S. Appl. No. 11/314,119 (Oct. 14, 2010).
Interview Summary for U.S. Appl. No. 11/427,171 (Oct. 13, 2010).
Decision to Grant a Patent for Japanese Patent Application No. 2007-549342 (Sep. 1, 2010).
Non-Final Official Action for U.S. Appl. No. 11/026,746 (Jul. 9, 2010).
Non-Final Official Action for U.S. Appl. No. 11/427,220 (Jul. 7, 2010).
Non-Final Official Action for U.S. Appl. No. 11/427,171 (Jun. 21, 2010).
Non-Final Official Action for U.S. Appl. No. 11/427,171 (Jun. 9, 2010).
Office Action for Japanese Patent Application No. 2007-549342 (May 13, 2010).
Notification to Make Divisional Application for Chinese Application No. 200580048016 (Apr. 7, 2010).
Non-Final Official Action for U.S. Appl. No. 11/314,119 (Apr. 1, 2010).
Official Action for U.S. Appl. No. 11/026,746 (Dec. 23, 2009).
Final Office Action for U.S. Appl. No. 11/427,200 (Nov. 20, 2009).
Restriction Requirement for U.S. Appl. No. 11/026,746 (Sep. 2, 2009).
Restriction Requirement for U.S. Appl. No. 11/026,746 (Apr. 2, 2009).
Office Action for U.S. Appl. No. 11/427,200 (Feb. 6, 2009).
Notification of Transmittal of the International Search Report and the Written Opinion of the International Searching Authority, or the Declaration for International Application No. PCT/US2006/048166 (Nov. 10, 2008).
Interview Summary for U.S. Appl. No. 11/427,200 (Oct. 27, 2008).
Communication of European Publication Number and Information on the Application of Article 67(3) EPC for European Patent No. 1969788 (Aug. 20, 2008).
Interview Summary for U.S. Appl. No. 11/427,200 (Jul. 14, 2008).
Office Action for U.S. Appl. No. 11/427,200 (Apr. 18, 2008).
Office Action for U.S. Appl. No. 11/427,200 (Sep. 28, 2007).
Notification of European publication number and information on the application of Article 67(3) EPC for European Application No. 05763863.7 (Aug. 16, 2007).
International Search Report and Written Opinion for International Application No. PCT/US05/18870 (Oct. 31, 2005).
Gallon et al., "Bandwidth Management in Next Generation Packet Networks," MSF Technical Report, MSF-TR-ARCH-005-FINAL, MultiService Forum (Aug. 2005).
"Denial of Service—Understanding Attack Techniques," White Paper (Jun. 22, 2005).
"Packet Voice Over Broadband," Light Reading—Networking the Telecom Industry (Mar. 3, 2005).
Walker et al., "Release 2 Architecture," MSF Release 2 Architecture, MSF-ARCH-002.00-FINAL, Multiservice Switching Forum (Jan. 4, 2005).

(56) References Cited

OTHER PUBLICATIONS

Le et al., "A Review of Mobility Support Paradigms for the Internet" (Jan. 2005).
"Session Border Controller," YENRA, http://www.yenra.com/session-border-controller/, pp. 1-2 (Oct. 18, 2004).
"Kagoor Delivers New XpressPath Media Routing," Enterprise Networks and Servers, http://www.enterprisenetworksandservers.com/monthly/art.php/.800, p. 1 (Jul. 2004).
"Media Access Control (MAC) Bridges," IEEE 802.1D Standard for Local and Metropolitan Area Networks (Jun. 9, 2004).
Intel, "Intel IXP2400 Network Processor Datasheet," Document No. 301164-011, pp. 1-126 (Feb. 2004).
Bond et al., "An Open Architecture for Next-Generation Telecommunication Services," ACM Transactions on Internet Technology, vol. 4, No. 1, pp. 83-123 (Feb. 2004).
Distributed Denial of Service Attacks, White Paper: Prolexic Technologies, Inc., Q4 (2004).
Rosenberg et al., "An Extension to the Session Initiation Protocol (SIP) for Symmetric Response Routing," RFC 3581, pp. 1-13 (Aug. 2003).
Schulzrinne et al., "RTP: A Transport Protocol for Real-Time Application," Network Working Group, RFC 3550 (Jul. 2003).
Rosenberg, "The Real Time Transport Protocol (RTP) Denial of Service (Dos) Attack and its Prevention," pp. 1-6 (Jun. 23, 2003).
"Virtual Bridged Local Area Networks," IEEE Standards 802.1Q, pp. 1-327 (May 7, 2003).
Garcia-Martin et al., "Private Header (P-Header) Extensions to the Session Initiation Protocol (SIP) for the 3rd-Generation Partnership Project (3GPP)," RFC 3455, pp. 1-34 (Jan. 2003).
Sisalem et al., "Denial of Service Attacks and SIP Infrastructure," 2003.
Rosenberg et al., "An Offer/Answer Model with the Session Description Protocol (SDP)," RFC 3264 (Jun. 2002).
Rosenberg et al., "SIP: Session Initiation Protocol," RFCc 3261, pp. 1-252 (Jun. 2002).
Rosenberg et al., "Session Initiation Protocol (SIP): Locating SIP Servers," RFC 3263, pp. 1-16 (Jun. 2002).
Hayes, "IP Based Multimedia Services Platform," Ericsson, 3GPP, ITU-T IMT-2000 and Beyond, Ottawa, Canada, 19 pages (May 28, 2002).
"Session Control in IMS Architecture," Newport Networks, White Papers (Copyright 2002-2005).
Acme Packet, Inc., "Session Admission control: Interactive communication SLAs over Skinny Pipes," 14 pages (2002).
Schulzrinne et al., "RTP Payload for DTMF Digits, Telephony Tones and Telephony Signals," Network Work Group, RFC 2833 (May 2000).
Handley et al., "SIP: Session Initiation Protocol," RFC 2543, pp. 1-143 (Mar. 1999).
"The E-Model, a Computational Model for use in Transmission Planning, " ITU-T, G.107, pp. 1-25 (Dec. 1998).
Handley et al., "SDP: Session Description Protocol," RFC 2327, pp. 1-40 (Apr. 1998).
Crocker, D., "ARPA Internet Text Messages," RFC 822 (Aug. 13, 1982).
"SDP: Session Description Protocol Overview (RFC 2327)," Javvin Network Management & Security (Downloaded from the Internet Aug. 15, 2005).
Final Office Action for U.S. Appl. No. 14/266,790 (Dec. 30, 2016).

* cited by examiner

FIG. 6B

MEDIA STREAM MANAGEMENT

PRIORITY

This application is a continuation of U.S. patent application Ser. No. 11/314,119, filed Dec. 21, 2005, the disclosure of which is hereby incorporated by reference in its entirety.

BACKGROUND

The present application relates to media stream management on the internet.

When communicating media over the internet, five problems arise: bandwidth management; hairpinning; backhauling; media path control; and equal access. These problems will be discussed below, such as in the context of Voice-over-Internet-Protocol (VoIP). It should be understood of course that the present application relates to any type of media stream management on the internet.

By way of background, the "Open Systems Interconnection" protocol (OSI) comprises a seven layer model: application (layer 7); presentation (layer 6); session (layer 5); transport (layer 4); network (layer 3); data link (layer 2); and physical (layer 1).

For VoIP, so-called "user agents" (UA) operating at the application layer send and receive information packets by use of the Session Internet Protocol (SIP), SDP, H.323, MGCP, Megaco etc. SIP and SDP are by far the most commonly used protocol for VoIP based communications.

Before discussing further the media communication problems of bandwidth, hairpinning, equal access, and backhauling, the following acronyms used hereafter are identified for convenience:

3GPP 3rd generation Partnership Project
AOR Address of Record
ASP Application Service Provider
AS Application Server
ATM Asynchronous Transfer Mode
BW Bandwidth
CAC Call Access Control
CDR Call Detail Record
CSCF Call/Session Control Function
DoS Denial of Service (attacks)
HTTP Hypertext Transport Protocol
IM Instant Messaging
ID Identification
IP Internet Protocol
ISP Internet Service Provider
IVR Interactive Voice Response
IXC Inter-Exchange Carrier
LSP Label Switched Path
MG Media Gateway
MIME Multi-Purpose Internet Mail Extensions
MM Media Management
MPLS Multi-Protocol Label Switching
MR Media Routing
MSC Multi-Protocol Session Controller
MSF R2 Multi-Service Switching Forum
NRX New Receive Address
P-CSCF Proxy Call Session Control Function
PDF Policy Decision Function
POP Point of Presence
PSTN Public Switched Telephone Network
QoS Quality of Service
RACF Resource and Admission Control Function
RBOC Regional Bell Operating Company
RTP Real-Time Transport Protocol
RTSP Real-Time Streaming Protocol
RX Receive Address/Port
SAP Session Announcement Protocol
SBC Session Border Controller
SDP Session Description Protocol
SIP Session Initiation Protocol
SLA Service Level Agreement
SRC Source
TCP Transmission Control Protocol
TISPAN TIPHON (Telecommunications and Internet Protocol Harmonization over Networks) and SPAN (Services and Protocols for Advanced Networks) (ETSI)
UDP Universal Datagram Protocol
VM Voice Mail
VoIP Voice over Internet Protocol
WWW World Wide Web First, the problem of bandwidth management will be discussed. According to the low-level design scheme, information to be communicated is broken down into discrete packets of information, and these packets are directed from an originating endpoint to a destination endpoint. A higher level protocol is used to establish a connection between the endpoints. Accordingly, a virtual communications link is established and a long message is broken down into multiple packets and sent by the sender. The receiving end collects these packets and reassembles them into the original long message. However, the individual packets that comprise the message may travel over different routes to reach the endpoint, depending on network availability, loading, etc.

When transmitting e-mail, web pages, and data files or the like, it is generally not crucial that data be transmitted in real-time, i.e., delays in the data transmission are generally acceptable if the intervening network is heavily loaded. However, with respect to real-time interactive communications, such as VoIP and videoconferences, excessive delay can make the communication unworkable. Therefore, for such real-time interactive media communications, properly allocating and managing the bandwidth is important. Also, as discussed hereafter, the problems of hairpinning, equal access, and backhauling need to be managed.

Now the problems known as "hairpinning", "bandwidth management" "media path control", "equal access" and "backhauling" will be explained.

Hairpinning describes the situation where the caller and callee are in the same network.

Bandwidth management is a problem where a network has to manage how bandwidth is allocated for multimedia sessions based on policies for network topology or network users. Bandwidth management is necessary in order to provide guaranteed QoS (Quality of Service) to sessions and media streams which are admitted in the network and to prevent sessions from being established through the network where bandwidth is not available (using policy). Bandwidth may be tracked on single networks or between networks.

Media Path Control is a problem where in order to control the QoS provided to a session media or to route the media through incompatible networks, the media stream needs to be routed through specific network elements (generally called media gateways or MGs). Media path is controlled independently from the path session signaling takes, especially in VoIP where the two paths are setup using different protocols (e.g. SIP for signaling and SDP for media).

Equal access is a regulatory requirement which allows a subscriber to access long distance services by dialing a special code on his phone before dialing the intended recipient, thereby choosing a carrier of his choice. The user's service provider thus has to open up access to his physical infrastructure or service to third party long distance providers. For VoIP and other Internet based applications this may mean that the session signaling (that is, a signal to begin a call such as "INVITE") and/or media stream must be routed to a third party long distance provider.

Media backhauling is a problem where media is upstreamed to the provider's core network where the service offered is controlled instead of being routed through a shorter path between the subscribers. The shorter path, which is preferred, is either a direct path between the subscribers of through local servers located close to the subscribers who do not have the service intelligence.

In attempting to deal with the aforementioned and described media stream management problems of bandwidth, hairpinning, media path control, equal access, and/or backhauling, it has previously been known to provide at least the following types of media management:
- RACF element in TISPAN architecture (provides bandwidth management);
- MIDCOM (IETF) framework specifies some form of media path control;
- Bandwidth Manager element in MSF R2 Architecture (provides bandwidth management;
- Session Border Controllers today integrating or coupling some forms of media management.

SUMMARY

It is an object to improve media stream management on the internet in the problem areas of bandwidth, hairpinning, media path control, equal access, and/or backhauling.

In a method and system for managing at least one media stream from a media source to a media destination, where the media stream passes through at least one network, providing a media manager for managing the media stream and the at least one network and for performing at least one of a plurality of management functions, wherein the plurality of management functions include bandwidth management, media hairpin detection, media path control, equal access or preventing media backhauling. Storing in the media manager at least one of a plurality of media stream information types, wherein the plurality of media stream information types include media routing, receive transport address, routed receive transport address, source network, destination network, media stream identifier, or bandwidth of the media stream is stored for a time period during which the media stream exists in the at least one network. The media manager uses at least one of the stored information types for performing at least one of the management functions.

DESCRIPTION OF THE PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

An overview of the management methods of the preferred embodiment, described hereafter in greater detail, is as follows:
- how a media manager MM detects media hairpinning (FIGS. 1, 2, 3A/3B, 4A/4B);
- how the media manager MM performs bandwidth management for remote networks (i.e., not directly connected to the media manager) (FIGS. 1, 2, 3A/3B, 4A/4B);
- how the media manager MM detects source and destination of the media streams from media signaling (like SDP, SDP-new, H.245) irrespective of where the session signaling (SIP, H.323, Megaco, RTSP) comes from or where it is destined to;
- how media path control can be provided based on the expected origination and destination networks (or caller/callee) of the media steam;
- how a solution for equal access management is provided using the media manager (FIGS. 1, 5, 6A/6B); and
- how media backhauling is prevented while still being able to provide policy based processing of media (FIGS. 1, 2, 3A/3B, 4A/4B)—it is noted that backhauling has the following disadvantages:
  - imposes high bandwidth requirements in parts of the network where only limited signaling is required; and
  - does not work in an ASP/ISP model where the signaling proxy may be owned by the ASP and the L3 (layer 3) network is owned by an ISP.

Figure 1:
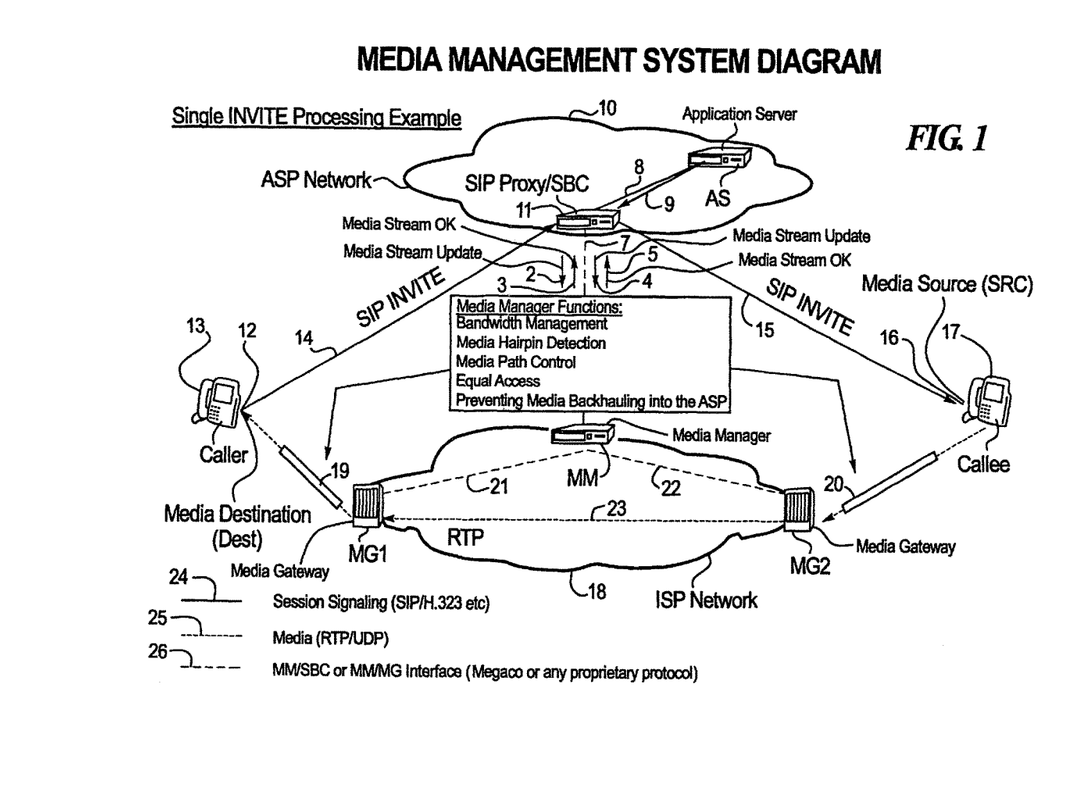
FIG. 1 shows a media management system diagram (network deployment) where media stream management functions are used for a SIP call.

FIG. 1 shows a media management system of the preferred embodiment where media stream management functions are used for a SIP call. It only shows INVITE request processing (known as call or session signaling) since all functions can be illustrated using that request as an example (an INVITE request is an invitation from a caller 13 (media destination 12) initiating a telephone call in VoIP to a callee 17 (media source 16). The processing for responses and other requests containing media information is identical.

A media manager MM may independently exist and connects to the other components shown (SIP proxy 11 (a server), and media gateways MG1, MG2) via standard or proprietary interfaces/protocols. The media manager MM may be bundled up with the SIP proxy 11 and/or MG (media gateway) elements MG1, MG2 (See FIG. 2) as well. FIG. 1 shows the information flow which illustrates the method used and the algorithm which is common to all deployment models.

In FIG. 1 the media manager MM holds the different types of media stream information (known as "information types" hereafter) for a particular media stream relating to the service being provided. For example, these information types are typically: 1) media routing information for the stream, denoted by MR, 2) destination transport addresses for the stream denoted by RX and NRX which contain an IP address and port pair, 3) source network SRC and destination network DEST information; and 4) bandwidth B/W information.

The AS is the Application Server which controls the service, and may be bundled within the SIP proxy 11 as shown in FIG. 1, but it need not be.

Figure 3A:
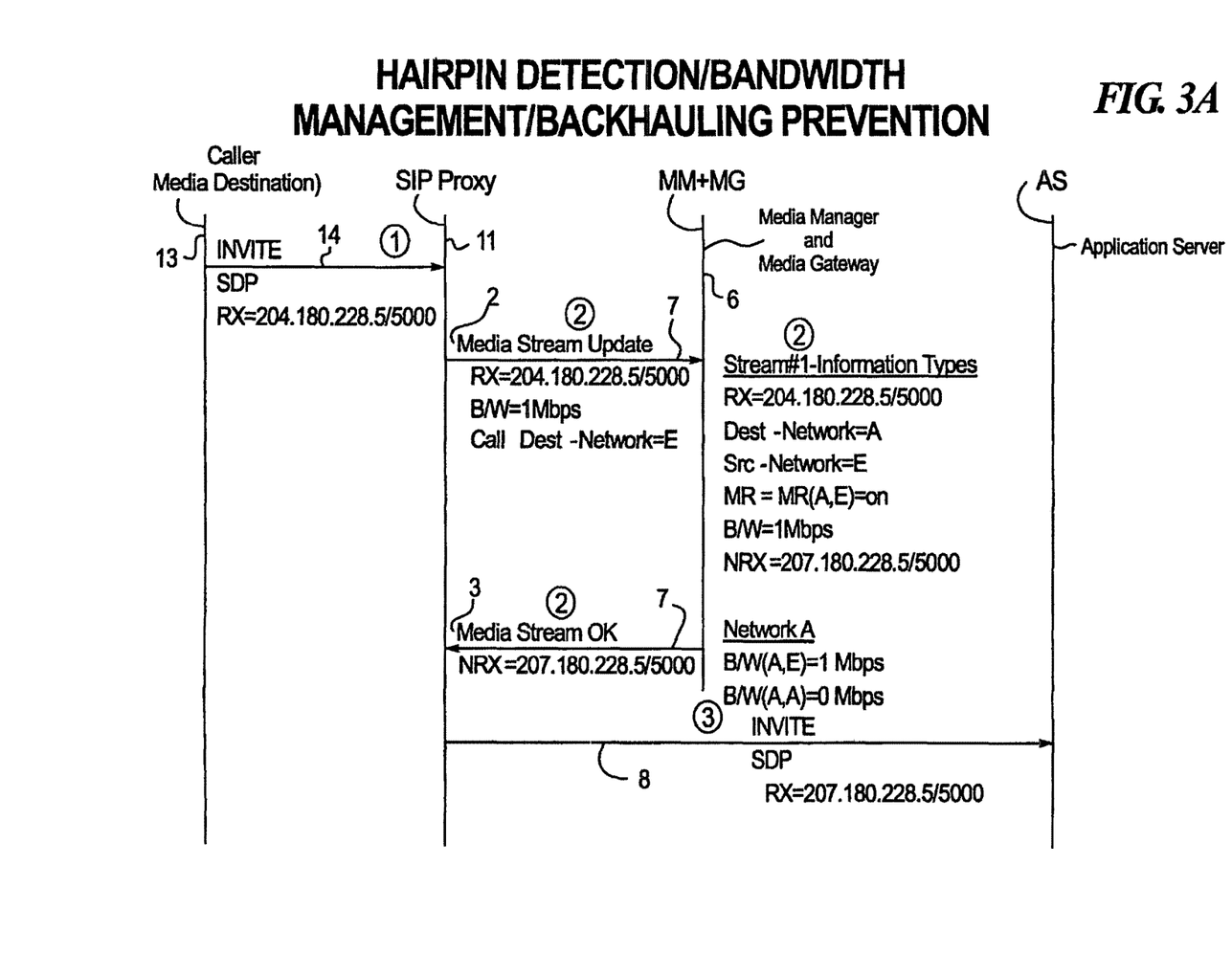
FIGS. 3A/3B show the six steps and the different types of information for the particular media stream present, which are stored in the media manager in FIG. 2, where media routing is required for all inter-network calls.
Figure 3B:
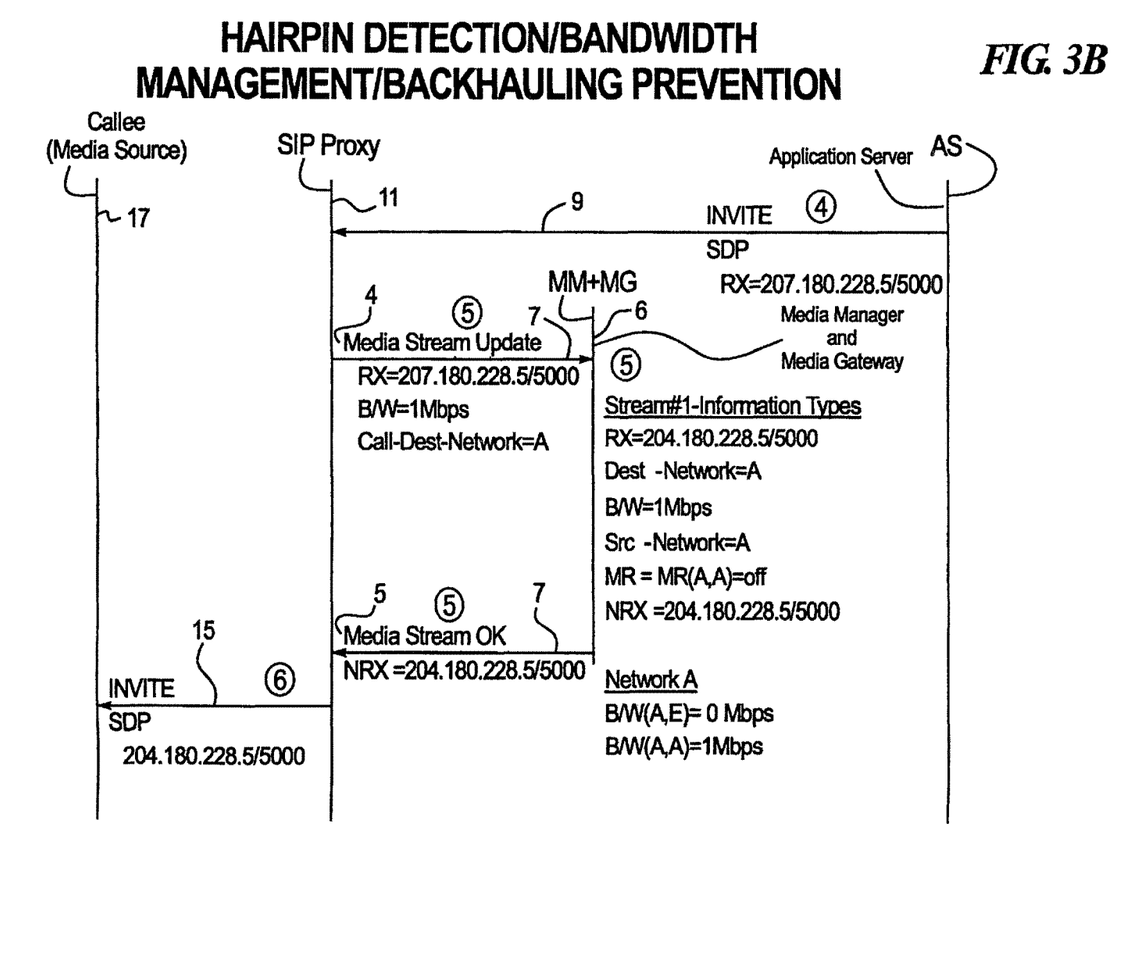

In a typical SIP call, the caller 13 (media destination 12) places the call on path 14 through the SIP proxy 11 to the application server AS along path 8, then back to the SIP proxy 11 along path 9, and then to the callee 17 (media source 16) along path 15. The SIP proxy 11 sends media stream update message (arrows 2 and 4) to the media manager MM to establish information types for a media stream in the media manager MM. Thus, the media manager MM can keep track of each media stream it knows in the networks it is managing, like the ISP Network 18. If the media stream is allowed by local policy and configuration on the media manager, it sends Media Stream OK message (arrows 3 and 5) to the SIP proxy 11. Otherwise, the Media Stream OK message is not sent (details not shown) and the SIP proxy 11 may decide the handling of the call at that point based on its own policy. At the end of the call, the SIP proxy 11 deletes the information types from the media manager MM (call termination is not shown). Details of the different stored media stream information types in the media manager MM are shown in FIGS. 3A/3B, 4A/4B, and 6A/6B.

Figure 2:
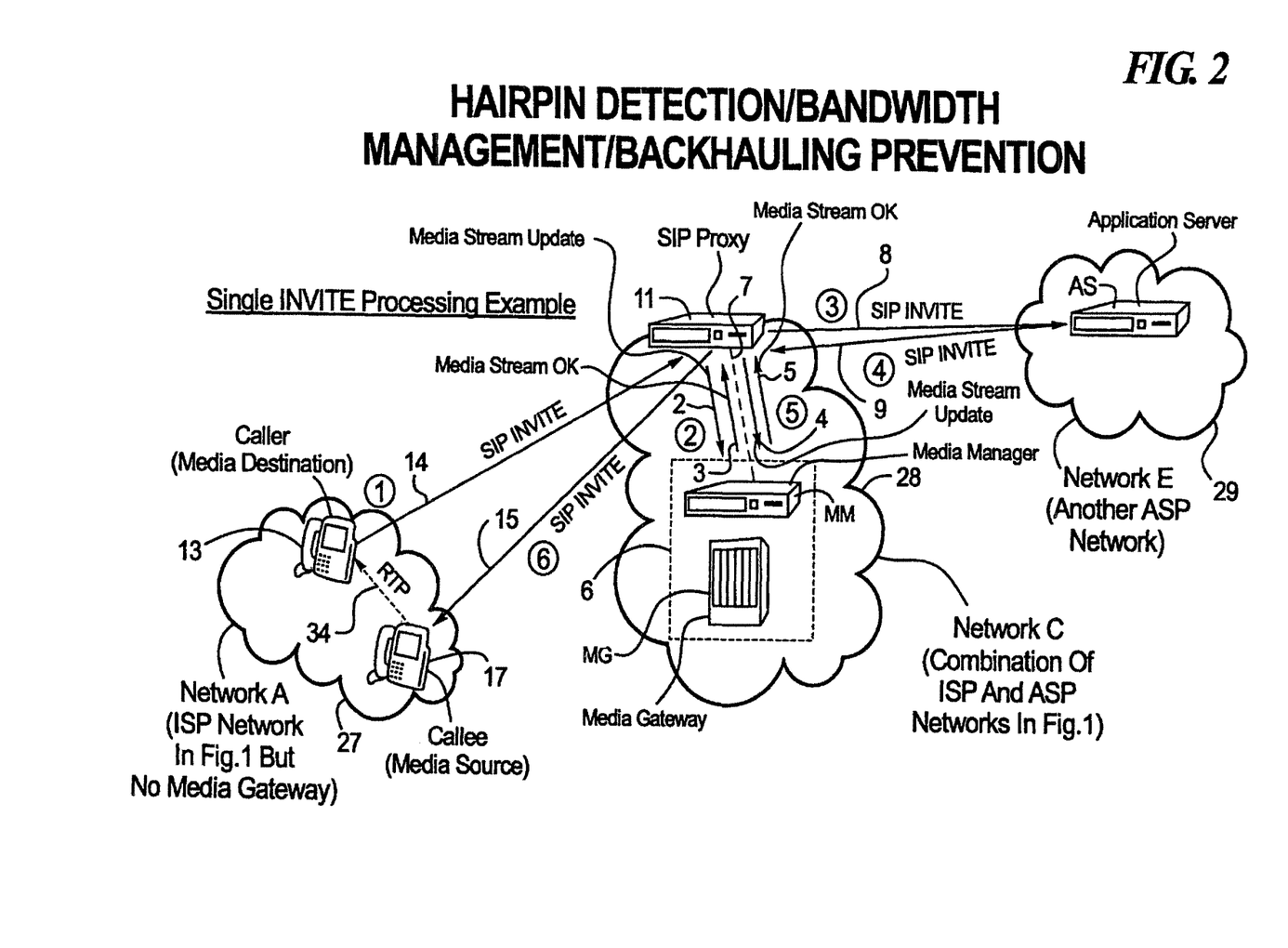
FIG. 2 shows a call flow in six steps to illustrate management functions for bandwidth management, hairpin detection, and media backhauling prevention.

The method of FIG. 1 is applicable to both of the scenarios where 1) a media stream is routed through an intermediate system as shown in FIG. 1 (i.e., the media gateways MG1, MG2); or 2) sent directly between the caller 13 and the callee 17, the example shown in FIG. 2.

FIG. 1 will now be described in greater detail.

First call signaling will be described. The caller 13 (media destination 12) initiates a SIP INVITE on the path 14 to the SIP proxy/SBC 11 in the ASP network 10. The SIP proxy 11 is linked by paths 8, 9 to the application server AS. The application server AS and the SIP proxy 11 send the SIP INVITE along path 15 to the callee 17 (media source 16).

Now media stream flow will be described. The ISP network shows media stream flow and includes the media manager MM and media gateway MG1 linked to the caller 13 via path 19, and media gateway MG2 linked to the callee 17 via path 20.

Dashed line 21 shows the MM/MG1 interface path in the ISP network 18. Dashed line 22 shows the MM/MG2 interface path in the ISP network 18. Dashed line 7 shows the MM/SBC interface path between the ISP network media manager MM and ASP network SIP proxy/SBC 11. All three of these dashed lines are illustrated in the legend key at 26.

Dashed line 23 shows the media stream path for the media stream (RTP/UDP) from media gateway MG1 to media gateway MG2. The legend key for this dashed line is indicated at 25.

Solid lines 14, 8, 9, and 15, relating to legend key 24, indicate the path for the session (also known as call) signaling SIP/H.323/Megaco/RTSP.

As shown in FIG. 1, the media manager MM performs one or more of the following management functions: bandwidth management; media hairpin detection; media path control; equal access management; and preventing media backhauling into the ASP network 10 used for session signaling.

FIG. 2 shows a SIP call flow to illustrate hairpin detection, bandwidth management, and media backhauling prevention. The information types which are stored in the media manager MM in FIG. 2 and the information types being sent to and from the media manager are shown in FIGS. 3A/3B and FIGS. 4A/4B.

In FIGS. 2, 3A/3B, and 4A/4B, a caller 13 places a call and the application server AS (where service is controlled) detects that a caller 13 is in the same network A (27) (which can be the ISP network in FIG. 1 but with media gateways) as the callee 17. The application server AS in network E (29), which is another ISP network, routes the call back into network A. At this point, the application server AS forwards the INVITE which is sent to the callee 17.

The caller 13 and callee 17 are assumed to be in the same network A as shown at 27.

The media manager MM and the media gateway MG are shown as a bundled system 6 in this example for simplicity. The interaction between the media manager MM and media gateway MG is not the subject of this preferred embodiment, but rather the subject of this preferred embodiment are the techniques used in the media manager MM which stores media stream information types to provide the indicated management functions.

In FIG. 2, the steps which occur during session signaling when the caller places the SIP INVITE call are indicated by circles 1-6. In step 1, caller 13 initiates the SIP INVITE call on path 14 to the SIP proxy 11. In step 2 the SIP proxy 11 may send the media stream update message 2 containing information types to the media manager in the bundled network 6 via path 7. The media manager then replies with the media stream OK message 3 if the media stream is allowed. In step 3 the SIP proxy sends the SIP INVITE on path 8 to the application server AS in network E (29), and the SIP INVITE then returns on path 9 to the SIP proxy 11 (step 4). In step 5, the media manager MM in bundled system 6 may send a media stream update message 4 to the media manager. The media manager then replies with media stream OK message 5 if the media stream is allowed. Thereafter in step 6 the SIP proxy 11 forwards the SIP INVITE on path 15 in step 6 to the callee 17.

Figure 4A:
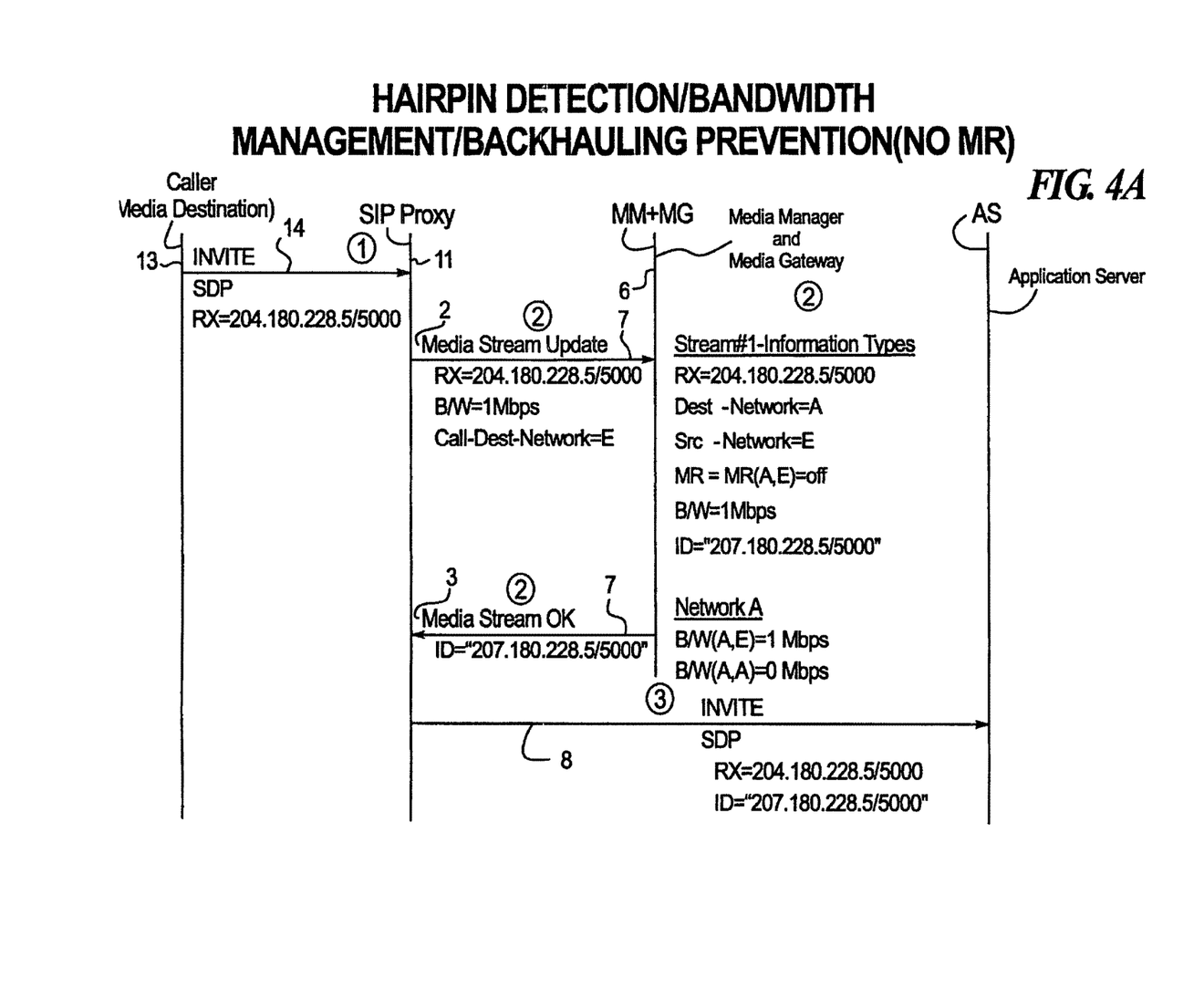
FIGS. 4A/4B show the six steps for a scenario where the media routing policy on the media manager MM for caller to external networks is different and this results in different information maintained by the media manager MM for some stages of INVITE processing (note that in the end, both FIGS. 4A/4B result in the same effect as FIGS. 3A/3B since the policy in the media manager MM for network A to network A calls is the same for the two cases)

FIGS. 3A/3B and 4A/4B will now be explained. In both figures, media routing for intra-network sessions is not required by the media manager MM policy configuration. FIGS. 3A/3B is the case where the media manager has been configured to route media for calls expected to be between networks A and E. FIGS. 4A/4B is the case where this is not required and shows the difference in stored information types on the media manager MM.

In step 1, only one media stream is shown on path 14 for simplicity (call INVITE) and the receive transport address (IP address and port) of this media stream are shown as information type RX under the SDP (session description protocol) designation.

In step 2 at path 7, the media stream update message 2 has information type MR (media routing) which contains information derived by executing media routing policy for the call expected at this point to be between networks A and E. The media manager MM expects to media route this call since MR(A,E) is "on".

In FIGS. 3A/3B and 4A/4B, the information types required for hairpin detection are: source network (Src-Network); destination network (Dest-Network); media routing (MR); and destination transport address (IP address and port) (marked as Dest IP). A port represents an end point or "channel" for network communication. Different ports allow different applications on a same computer to utilize network resources without interfering with each other.

In FIGS. 3A/3B and 4A/4B, the information types required for bandwidth management are: bandwidth (B/W) calculated when processing the event; Dest IP (with port); MR; Src-Network; and Dest-Network. The bandwidth allocated to the media stream is stored as an information type corresponding to the media stream. The information for the source and destination network of the streams may also be maintained though they can be calculated using the former stored information values.

The method for computing bandwidth for the networks can be described as follows. For all media streams maintained, the bandwidth used for source and destination networks is aggregated as well as the bandwidth used between these networks. This may be an alternative to maintaining the network at runtime.

The information types required for backhaul prevention are: the Dest-IP (with port), MR; SRC Network; and Dest Network. The media manager MM thus maintains the information types of the media stream.

The media manager MM computes various information types for the media stream as well as other objects like source and destination network or intermediate networks which it is aware the media stream will pass through. Some examples of this computation are illustrated for network A. Note that all of the computations are actually derived from the information types maintained for the media stream itself, and it can be either stored or computed on demand based on the media manager MM's knowledge of the media streams.

The media manager MM uses information from the SIP proxy 11 to determine where the media stream is destined to go (based on transport address RX) and what the tentative source network is where it will be originated (based on Call-Dest-Network). This latter source network is where the SIP proxy thinks the media stream is destined to. The media routing MR information type for the call is determined using the source and destination information type media routing—MR(A, E)=on. This preferred embodiment focuses on the use of stored media stream information types maintained on a per media stream basis to implement the management functions.

Using the media stream information types, the media manager MM can compute the bandwidth used between various networks or for a single network. For example, the bandwidth between network A and network E is 1 Mbps since it is known that there is a single media stream which is expected to exist originating from network E and terminating on network A. Note that the computation can be done for any object as long as its relationship to the media stream is known. For example the information type bandwidth (BW) can also be computed for a transit network as long as the topology is known of how the transit network is located between networks A and E.

In step 2 the media manager MM also sends the Media Stream OK message 3 to the SIP proxy if the media stream satisfies the local policy configuration on the media manager MM. For example, if the B/W(A,E) and B/W(A,A) are within configured limits on the media manager MM, the OK message 3 is sent. The Media Stream OK message 3 also contains the transport address NRX (See FIG. 3A) or unique ID (see FIG. 4A) which is to be inserted by the SIP Proxy in the outgoing message's SDP. This address/unique ID is calculated by the MM+MG system to create a unique reference for media streams (NRX or unique ID) as well as alter the path of the media stream (using NRX only in FIG. 3A) if required by policy In summary, in step 2 the SIP proxy 11 sends a media stream update message 2 containing information types for the particular media stream to the media manager which are then stored by the media manager.

Steps 3 and 4 are executed by the SIP Proxy and Application server and simply result in the SIP message to be forwarded along the indicated paths.

Figure 4B:
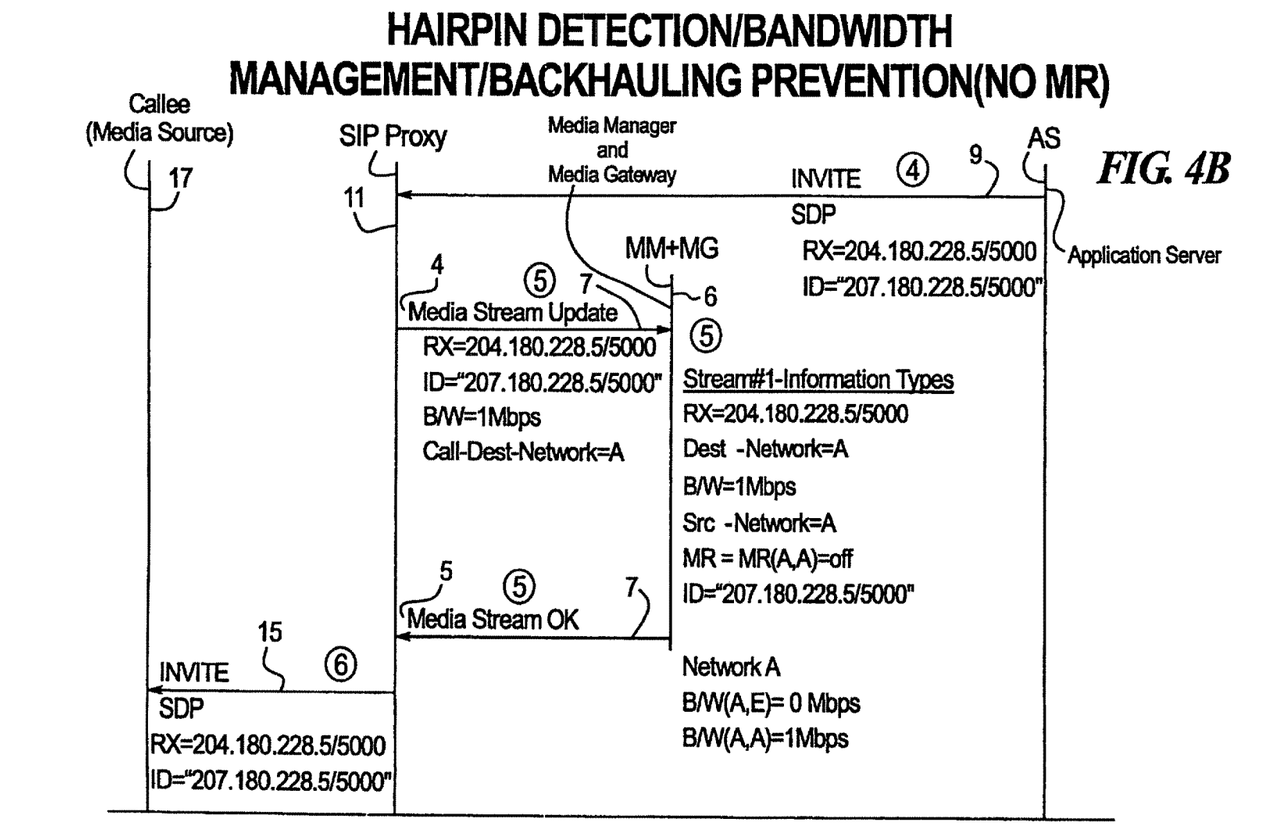

In step 5, the SIP proxy sends the Media Stream Update message 4 to the media manager which contains the same information it sent earlier in Step 2 to the media manager. The media manager MM finds a "hit" in its run time cache/database of media streams it knows already exists in the network A. The hit is based on either the receive address RX (IP/port information) or the unique ID (FIGS. 4A/4B). When a hit is found, the media manager MM retrieves and updates the information types it created for the media stream in previous step 2. It now knows that the source network of the media stream is where the INVITE is destined to (which is network A itself) and re-applies the media routing policy. This is the hairpinning management scenario. The MM determines by applying the policy for media routing network A, MR(A, A) and determines that it is disabled. Since media routing is no longer necessary (directed by policy in the example), the media manager MM pushes the old media destination stored in the Dest-IP information type as NRX in the Media Stream OK message 5 to the SIP Proxy 11.

In step 5, the bandwidth for network A is also updated. It is now known that there are no expected media streams between the networks A and E, and there is a single media stream within network A. So B/W(A,E)=0 Mbps and B/W(A,A)=1 Mbps.

Since the SIP proxy 11 is able to push back the old media destination in the INVITE, media backhauling to the network C (or the application server or the SIP Proxy) is prevented. In this way, it is prevented unless necessary (e.g. for private to public network calls).

For the bandwidth management function, the media manager creates an aggregated bandwidth value for at least one network from values of the bandwidth information type of at least one media stream and all additional media streams passing through the at least one network. A new media stream is disallowed from setup in the at least one network if the aggregated bandwidth value exceeds an administratively provided bandwidth value in the media manager for the at least one network. The media source and the media destination may lie in the at least one network being managed.

Also for bandwidth management, a media stream may be passing through at least two networks; and the media manager creates an aggregated bandwidth value for the at least two networks from values of the bandwidth information type of the at least one media stream and all additional media streams passing through the at least two networks.

For the media hairpin detection function the media manager detects that values of the information types source network and destination network of at least one media stream are the same.

The media manager performs the backhauling prevention function by not routing a media stream in case a management determined policy of the media manager between media source network and media destination network does not require the media stream to be routed through a media gateway.

Figure 5:
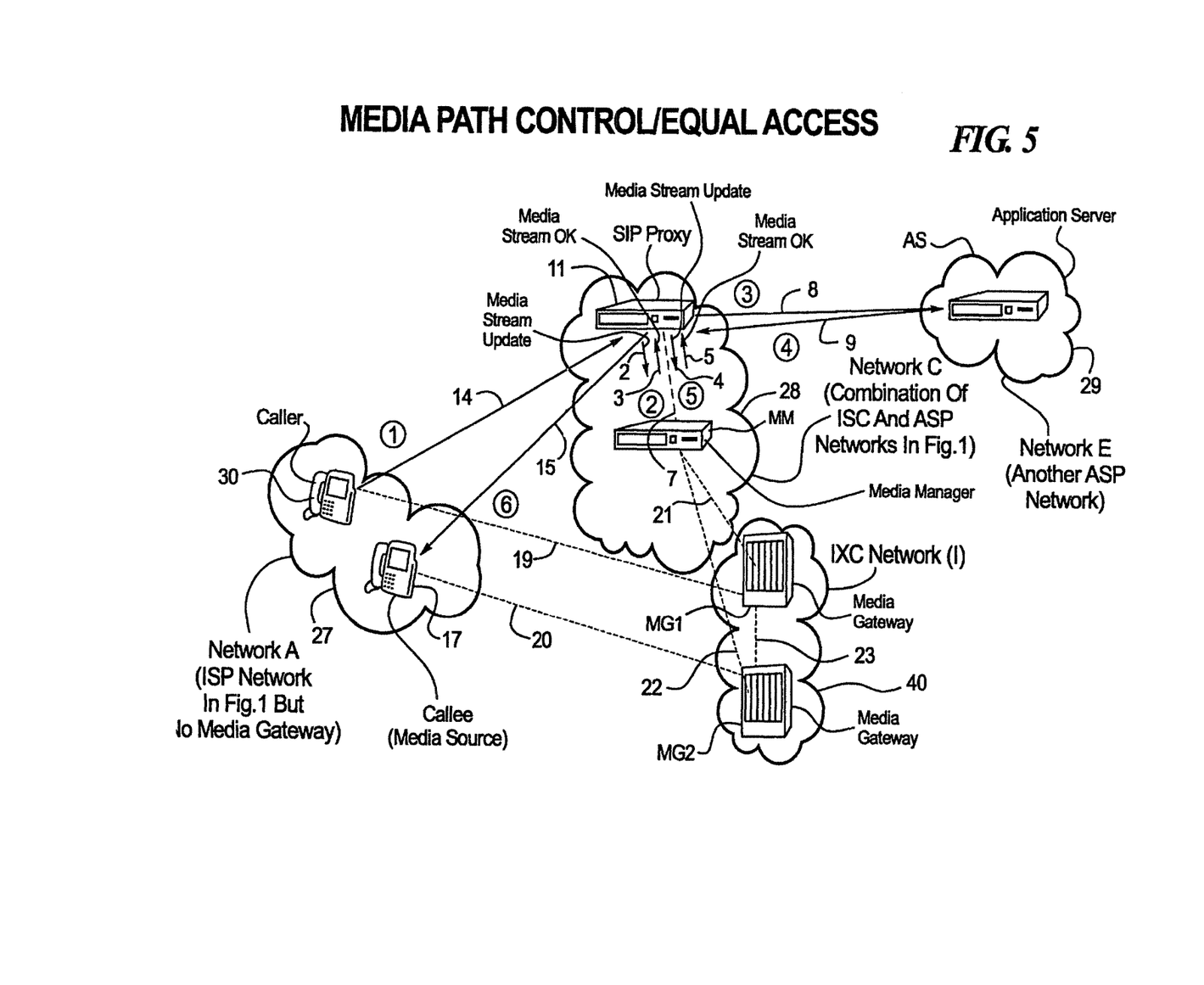
FIG. 5 shows a six step call flow to illustrate media path control and equal access management by the media manager.

FIG. 5 shows a media routing scenario, and more specifically a solution for media path control and equal access. Steps 1-3 are the same as in FIGS. 2 and 3A/3B. The point where it differs is steps 4 and 5, as shown in FIGS. 6A/6B.

In step 4, the application server AS or the SIP proxy 11 may decide that in fact this call needs to pass through a provider selected by the user or administrator. If this information is decided by the application server AS, it is sent in the same INVITE back to the SIP proxy 11. The SIP proxy 11 may also invoke local policy to determine that the call needs to be sent through an interim network, as well (network I).

In step 5, the same as before in FIGS. 2, 3A/3B, and 4A/4B, there is a "hit" with the previous information types stored for the existing media stream. The SIP Proxy also sends the Media Stream Update message 4 for the interim network with the Call-Interim-Network=I information type. The existing information types are updated as well as the new information types created since there is more than one media stream. As shown in FIG. 5, the new network which is inserted in the middle of the call is the IXC network I labeled 40. The media manager MM in this example inserts two media gateways MG1 and MG2 into the media stream and updates the information types with the media stream OK message 5 for the individual media streams as indicated in step 5. These media gateways MG are selected based on the information provided by the SIP Proxy in the Call-interim-Network information type. The example shows two media gateways MG1 and MG2, but in reality there could be just one or more than two. These are connected by path 43 to each other and via paths 41 and 42 to caller 13 and callee 17, respectively. The information types are updated for stream 1 and the new information types are created for stream 2 as shown. Example computations for networks A and I are shown as well.

Figure 6A:
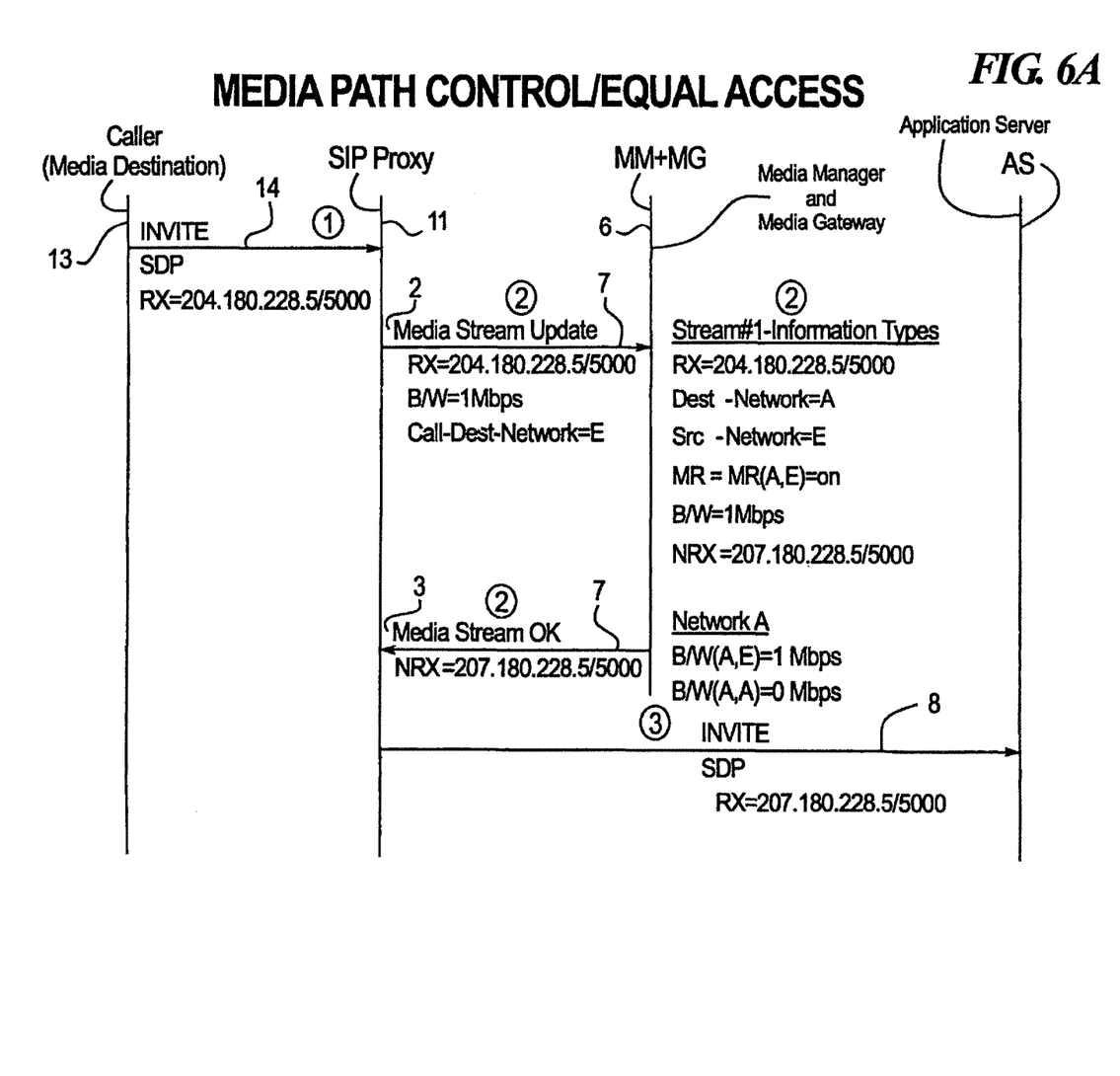
FIGS. 6A/6B show the six steps and the different types of information for the particular media stream present and which are stored in the media manager for the media path control and equal access management examples of FIG. 5 (in a media routing scenario).
Figure 6B:
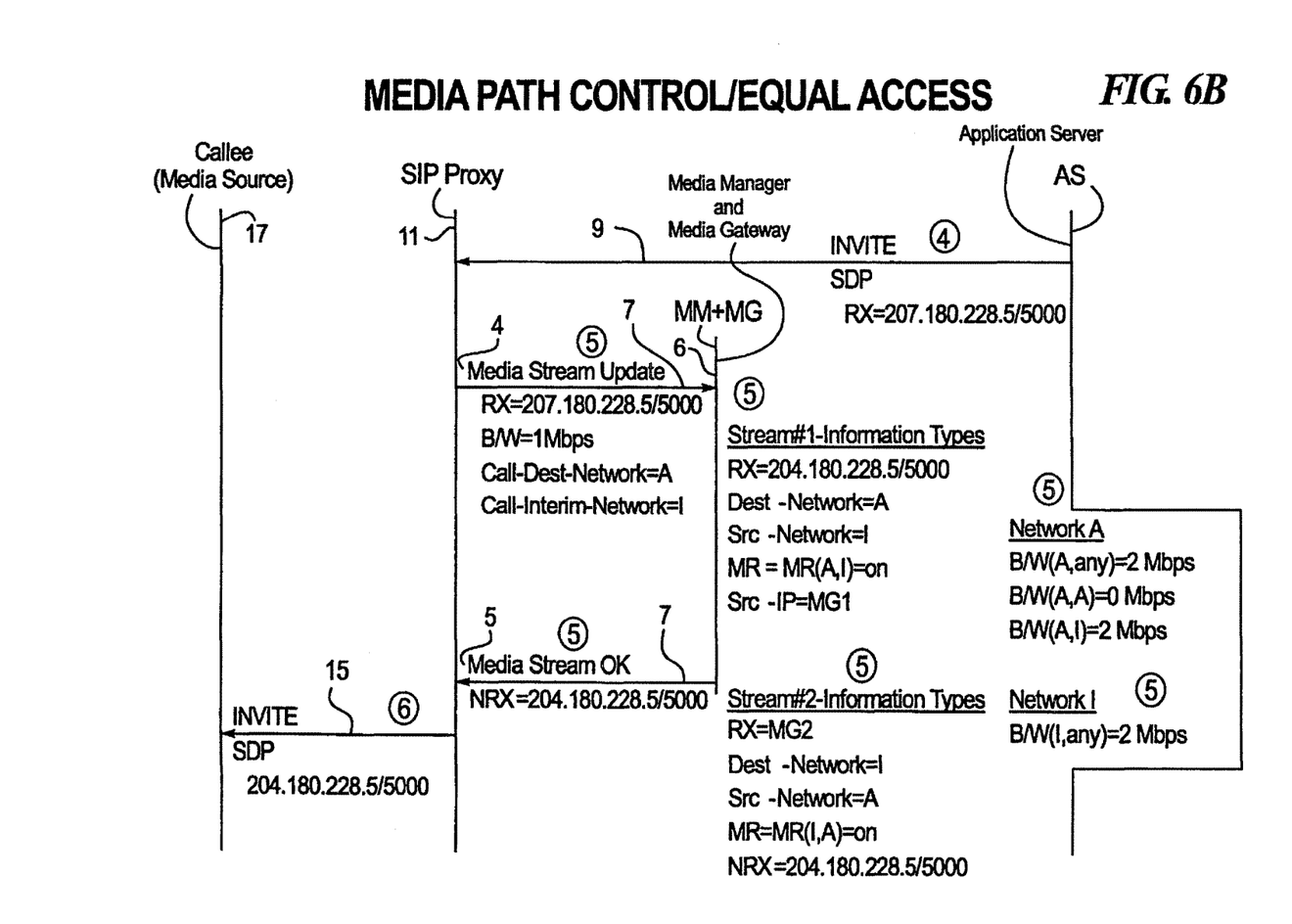

Like for FIGS. 3A/3B, FIGS. 6A/6B show the six steps and explain the stored information types of the media manager MM, but for the equal access example of FIG. 5 as explained above.

For the media path control function the media manager based on stored information types alters media source and media destination information type values of a media stream by altering values of at least some of the stored information types of the media stream and creating a new media stream with associated information types having new values, and sending the routed receive transport address of the new media stream to the media source.

For the equal access management function the media manager inserts at least one media gateway of a long distance carrier chosen by the media destination centrally of the at least one media stream. The media manager inserts the at least one media gateway, based on provisional information stored in said media manager, by altering a value of at least one of the information types of the media stream, and sending the routed receive transport address of the media stream to the media source.

The method of the preferred embodiment is equally applicable for any session layer protocols like SIP, H.323, RTSP, MGCP, Megaco carrying session layer media information in protocols like SDP, H.245 and new versions of SDP being developed at the IETF (Internet Engineering Task Force)

The ISP Network and the ASP network are shown separated for the preferred embodiment only; they may, however, be administratively controlled by the same entity and the separation may either not exist or be purely logical where the ASP network represents the core of the same network and the ISP network represents the access of the same network.

Some of the variations, among many other possible variations, in the above preferred embodiment method are:
- the media manager MM can be integrated inside the SBC or the SIP proxy;
- the media manager MM can be integrated inside the media gateway MG;
- a protocol used between the SIP proxy/SBC and the media manager MM could be anything;
- a protocol used between the media gateway MG and the media manager MM could be anything.

This listing of some possible variations is not intended to limit the scope of this disclosure which is showing a preferred embodiment among many possible embodiments.

In the preferred embodiment, the media manager is not required to have the capabilities of managing all the indicated functions but may perform only one of the management functions indicated.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for managing at least one media stream from a media source to a media destination, said media stream passing through at least one network, comprising the steps of:
    providing a media manager for managing said media stream and said at least one network and for performing at least one of a plurality of management functions, wherein the plurality of management functions include bandwidth management, media hairpin detection, media path control, equal access, or preventing media backhauling, wherein a media manager has an interface path to a session layer protocol proxy and an interface path to a media gateway, the media gateway being linked to either a media source or a media destination;
    receiving, from the session layer protocol proxy, a media stream update message to establish a plurality of media stream information types for the media stream;
    storing in said media manager at least one of the plurality of media stream information types, wherein the plurality of media stream information types include media routing, receive transport address, routed receive transport address, source network, destination network, media stream identifier, or bandwidth of the media stream for a time period during which said at least one media stream exists in said at least one network; and
    said media manager using at least one of said stored information types for performing at least one of said management functions.

2. The method of claim 1 wherein said bandwidth management function comprises the steps of: creating an aggregated bandwidth value for said at least one network from values of said bandwidth information type of said at least one media stream and all additional media streams passing through said at least one network.

3. The method of claim 2 wherein a new media stream is disallowed from setup in said at least one network if said aggregated bandwidth value exceeds an administratively provided bandwidth value in said media manager for said at least one network.

4. The method of claim 2 wherein the media source and the media destination lie in said at least one network being managed.

5. The method of claim 1 wherein for bandwidth management, said at least one media stream is passing through at least two networks; and said media manager creates an aggregated bandwidth value for said at least two networks from values of said bandwidth information type of said at least one media stream and all additional media streams passing through said at least two networks.

6. The method of claim 1 wherein for said media hairpin detection function said media manager detects that values of the information types source network and destination network of said at least one media stream are the same.

7. The method of claim 1 wherein for the media path control function said media manager based on stored information types alters the media source and media destination information type values of said at least one media stream by altering values of at least some of the stored information types of said at least one media stream and creating a new media stream with associated information types having new values, and sending the routed receive transport address of said new media stream to the media source.

8. The method of claim 1 wherein for the equal access management function said media manager inserts at least one media gateway of a long distance carrier chosen by said media destination centrally of said at least one media stream.

9. The method of claim 8 wherein said media manager inserts said at least one media gateway, based on provisional information stored in said media manager, by altering a value of at least one of the information types of said at least one media stream, and sending the routed receive transport address of said at least one media stream to said media source.

10. The method of claim 1 wherein said media manager performs said backhauling prevention function by not routing said media stream in case a management determined policy of said media manager between said media source network and said media destination network does not require the at least one media stream to be routed through a media gateway.

11. The method of claim 1 wherein said media manager is provided inside an SIP server.

12. The method of claim 1 wherein said media manager is provided inside a media gateway.

13. The method of claim 1 wherein said at least one network has at least one media gateway and said media manager controls said at least one media gateway.

14. The method of claim 1 wherein said media manager communicates with a session server which comprises an SIP proxy.

15. The method of claim 1 wherein the media stream comprises a voice-over internet protocol media stream.

16. The method of claim 1 wherein said at least one network has at least one media gateway and the media manager is bundled with the media gateway.

17. The method of claim 1 wherein said media manager communicates with a session server which comprises an SBC server.

18. The method of claim 1 wherein said at least one network comprises an ISP network with at least one media gateway and an RTP path.

19. The method of claim 1 wherein said at least one network has no media gateways and an RTP path between the media source and the media destination.

20. The method of claim 1 wherein during a signaling session, an invitation is sent from the media destination to the session server, then to the media manager, then to the application server, then from the application server back to the session server, then through the media manager to the session server, and then to the media source.

21. The method of claim 1 wherein a session server with which said media manager communicates is in an ASP network and said media manager is in an ISP network.

22. The method of claim 1 wherein a session server and said media manager in communication with said session server are in a common network.

23. The method of claim 22 wherein a media gateway is also provided in said common network with said media manager.

24. The method of claim 1 wherein a session server is provided in communication with said media manager, and said session server sends a media stream update message to said media manager, and said media manager responds with a media stream OK message depending upon how said media manager is managing at least one of said management functions.

25. A system for managing at least one media stream from a media source to a media destination, comprising:
  at least one network through which said media stream passes;
  a media manager connected to said at least one network for managing said at least one media stream by performing at least one of a plurality of management functions, wherein the plurality of management functions include bandwidth management, media hairpin detection, media path control, equal access, or preventing media backhauling, wherein the media manager has an interface path to a session layer protocol proxy and an interface path to a media gateway, the media gateway being linked to either a media source or a media destination, wherein the media manager receives, from the session layer protocol proxy, a media stream update message to establish a plurality of media stream information types for the media stream;
  a storage element in said media manager which stores at least one of the plurality of media stream information types, wherein the plurality of media stream information types include media routing, receive transport address, routed receive transport address, source network, destination network, media stream identifier, or bandwidth of the media stream for a time period during which said media stream exists in said at least one network; and
  said media manager using at least one of said stored information types for performing at least one of said management functions.

26. The system of claim 25 wherein said bandwidth management function comprises: creating an aggregated bandwidth value for said at least one network from values of said bandwidth information type of said at least one media stream and all additional media streams passing through said at least one network.

27. The system of claim 26 wherein a new media stream is disallowed from setup in said at least one network if said aggregated bandwidth value exceeds an administratively provided bandwidth value in said media manager for said at least one network.

28. The system of claim 26 wherein the media source and the media destination lie in said at least one network being managed.

29. The system of claim 25 wherein for bandwidth management, said media stream is passing through at least two networks; and said media manager creates an aggregated bandwidth value for said at least two networks from values of said bandwidth information type of said at least one media stream and all additional media streams passing through said at least two networks.

30. The system of claim 25 wherein for said media hairpin detection function said media manager detects that values of the information types source network and destination network of said at least one media stream are the same.

31. The system of claim 25 wherein for the media path control function said media manager based on stored information types alters the media source and media destination information type values of said at least one media stream by altering values of at least some of the stored information types of said at least one media stream and creating a new media stream with associated information types having new values, and sending the routed receive transport address of said new media stream to the media source.

32. The system of claim 25 wherein for the equal access management function said media manager inserts at least one media gateway of a long distance carrier chosen by said media destination centrally of said at least one media stream.

33. The system of claim 32 wherein said media manager inserts said at least one media gateway, based on provisional information stored in said media manager, by altering a value of at least one of the information types of said media stream, and sending the routed receive transport address of said media stream to said media source.

34. The system of claim 25 wherein said media manager performs said backhauling prevention function by not routing said media at least one stream in case a management determined policy of said media manager between said media source network and said media destination network does not require the media stream to be routed through a media gateway.

35. A computer program product comprising computer executable instructions embodied in a non-transitory computer readable medium for performing the steps of:
    managing a media stream and at least one network for performing at least one of a plurality of management functions, wherein the plurality of management functions include bandwidth management, media hairpin detection, media path control, equal access, or preventing media backhauling, wherein a media manager has an interface path to a session layer protocol proxy and an interface path to a media gateway, the media gateway being linked to either a media source or a media destination;
    receiving, from the session layer protocol proxy, a media stream update message to establish a plurality of media stream information types for the media stream;
    storing in said media manager storage at least one of the plurality of media stream information types, wherein the plurality of media stream information types include media routing, receive transport address, routed receive transport address, source network, destination network, media stream identifier, or bandwidth of the media stream for a time period during which said media stream exists in said at least one network; and
    using at least one of said media manager stored information types for performing at least one of said management functions.

36. The computer program product of claim 35 wherein said bandwidth management function comprises the steps of: creating an aggregated bandwidth value for said at least one network from values of said bandwidth information type of said at least one media stream and all additional media streams passing through said at least one network.

37. The computer program product of claim 36 wherein a new media stream is disallowed from setup in said at least one network if said aggregated bandwidth value exceeds an administratively provided bandwidth value in said media manager for said at least one network.

38. The computer program product of claim 36 wherein the media source and the media destination lie in said at least one network being managed.

39. The computer program product of claim 35 wherein for bandwidth management, said media stream is passing through at least two networks; and said media manager creates an aggregated bandwidth value for said at least two networks from values of said bandwidth information type of said at least one media stream and all additional media streams passing through said at least two networks.

40. The computer program product of claim 35 wherein for said media hairpin detection function said media manager detects that values of the information types source network and destination network of said at least one media stream are the same.

41. The computer program product of claim 35 wherein for the media path control function said media manager based on stored information types alters the media source and media destination information type values of said at least one media stream by altering values of at least some of the stored information types of said at least one media stream and creating a new media stream with associated information types having new values, and sending the routed receive transport address of said new media stream to the media source.

42. The computer program product of claim 35 wherein for the equal access management function said media manager inserts at least one media gateway of a long distance carrier chosen by said media destination centrally of said at least one media stream.

43. The computer program product of claim 42 wherein said media manager inserts said at least one media gateway, based on provisional information stored in said media manager, by altering a value of at least one of the information types of said at least one media stream, and sending the routed receive transport address of said media stream to said media source.

44. The computer program product of claim 35 wherein said media manager performs said backhauling prevention function by not routing said media stream in case a management determined policy of said media manager between said media source network and said media destination network does not require the media stream to be routed through a media gateway.

* * * * *